US011897278B2

(12) United States Patent
Beaucher

(10) Patent No.: US 11,897,278 B2
(45) **Date of Patent: *Feb. 13, 2024**

(54) WRITING INSTRUMENT EQUIPPED WITH A LOCKING DEVICE

(71) Applicant: Societe BIC, Clichy (FR)

(72) Inventor: Laurent Beaucher, Chennevières-sur-Marne (FR)

(73) Assignee: SOCIÉTÉ BIC, Clichy (FR)

( * ) Notice: Subject to any disclaimer, the term of this patent is extended or adjusted under 35 U.S.C. 154(b) by 28 days.

This patent is subject to a terminal disclaimer.

(21) Appl. No.: 17/194,684

(22) Filed: Mar. 8, 2021

(65) Prior Publication Data

US 2021/0187995 A1 Jun. 24, 2021

Related U.S. Application Data

(63) Continuation of application No. 16/606,323, filed as application No. PCT/FR2018/050977 on Apr. 18, 2018, now Pat. No. 10,967,668.

(30) Foreign Application Priority Data

Apr. 19, 2017 (FR) ...................................... 1753386

(51) Int. Cl.
*B43K 24/03* (2006.01)
*B43L 19/00* (2006.01)
*B43K 24/08* (2006.01)

(52) U.S. Cl.
CPC .......... *B43K 24/03* (2013.01); *B43L 19/0081* (2013.01); *B43K 24/086* (2013.01)

(58) Field of Classification Search
CPC ........ B43K 24/03; B43K 24/04; B43K 24/02; B43K 24/086; B43K 24/12; B43K 24/166; B43K 24/00
See application file for complete search history.

(56) References Cited

U.S. PATENT DOCUMENTS 2,587,935 A 3/1952 Wallace
2,605,746 A * 8/1952 Kahn .................... B43K 24/02 401/112

(Continued)

FOREIGN PATENT DOCUMENTS

CN 105082830 B 5/2017
DE 102013021815 A1 6/2015

(Continued)

OTHER PUBLICATIONS

International Search Report dated Jul. 2, 2018 for International Application No. PCT/FR2018/050977 and English Translation (5 pages).

*Primary Examiner* — Patrick M. Buechner
(74) *Attorney, Agent, or Firm* — Bookoff McAndrews, PLLC

(57) ABSTRACT

A manual device including a first portion and a second portion. The second portion being at least partially fitted into the first portion and being moveable in translation relative to the first portion. The first portion having a first distal end while the second portion has a second distal end opposite the first distal end. The second portion also includes a locking device designed to prevent the first portion from moving in translation relative to the second portion only when, considered in the direction of gravity. The first distal end is arranged above the second distal end, and the locking device includes a chamber and a ball or equivalent accommodated in the chamber. The chamber is provided only in the second portion.

20 Claims, 5 Drawing Sheets

(56) References Cited

U.S. PATENT DOCUMENTS

| | | | | | |
|---|---|---|---|---|---|
| 2,813,511 | A | | 11/1957 | Kersten | |
| 2,888,907 | A | | 6/1959 | Kersten | |
| 4,352,580 | A | | 10/1982 | Ando | |
| 4,377,349 | A | | 3/1983 | Kunii | |
| 4,669,904 | A | * | 6/1987 | Kageyama ............. | B43K 24/03<br>401/109 |
| 4,729,685 | A | | 3/1988 | Bruhn et al. | |
| 10,967,668 | B2 | * | 4/2021 | Beaucher ............... | B43K 29/00 |
| 2017/0274700 | A1 | * | 9/2017 | Kim ....................... | B43K 24/03 |

FOREIGN PATENT DOCUMENTS

| | | | | |
|---|---|---|---|---|
| FR | 984548 | A | | 7/1951 |
| FR | 1100962 | A | | 9/1955 |
| GB | 869699 | A | * | 9/1958 |
| GB | 2381243 | B | | 11/2003 |
| JP | 2015020282 | A | * | 2/2015 |
| JP | 2015020282 | A | | 2/2015 |

* cited by examiner

WRITING INSTRUMENT EQUIPPED WITH A LOCKING DEVICE

CROSS REFERENCE TO RELATED APPLICATIONS

This application is a continuation of U.S. application Ser. No. 16/606,323, filed Oct. 18, 2019, which is a National Stage application of International Application No. PCT/FR2018/050977, filed on Apr. 18, 2018, now published as WO/2018/193213 and which claims priority to French Application No. 1753386, filed Apr. 19, 2017, the entire contents of which is incorporated herein by reference.

FIELD

The present disclosure relates to a manual device provided with a locking device moveable in translation from one portion in relation to another based on the relative position of the two portions considered in the direction of gravity. Such a manual device may notably be a writing instrument, though not only.

DESCRIPTION OF RELATED ART

Manual devices having a first portion moveable in relation to a second portion are known, e.g. the rear portion of a writing instrument having an eraser that is moveable in relation to the front portion of the writing instrument. However, when a user wishes to use the second portion, e.g. to erase, the second portion remains moveable relative to the first portion, which can lead the user to displace the second portion in relation to the first portion inadvertently, which is inconvenient and can make the writing tip retract/protrude, for example, while the user is erasing. Such an operation is not generally desired. There is therefore a need in this sense.

SUMMARY

An embodiment relates to a manual device, in particular, but not only, a writing instrument, comprising a first portion and a second portion, the second portion being at least partially fitted into the first portion and being moveable in translation in an axial direction relative to the first portion (and conversely), the first portion having a first distal end while the second portion has a second distal end opposite the first distal end in the axial direction, and a locking device designed to prevent the first portion from moving in translation in the axial direction relative to the second portion (and conversely) only when, considered in the direction of gravity, the first distal end is arranged above the second distal end, the locking device comprising a chamber and a ball or equivalent accommodated in the chamber, the chamber being provided only in the second portion.

It is understood that the second portion is entirely or partially fitted into the first portion. For example, the fitting direction corresponds to the axial direction. Of course, each part can be designed as one and the same piece or rather multiple pieces assembled together. Furthermore, and unless otherwise indicated, "displacement/movement in translation/sliding of the first portion in relation to the second portion" is quite obviously understood as the relative displacement/movement in translation/sliding of the first portion in relation to the second portion and conversely (i.e. the relative displacement/movement in translation/sliding of the second portion in relation to the first portion).

"Direction of gravity" is understood, of course, as the direction of Newtonian gravitational acceleration created by the earth or, more generally, by the body or star on which the manual device is used.

"Ball or equivalent" is understand as any solid element with any shape, mobile in the chamber, and able to be displaced in the chamber under the effect of gravity relative to the walls delimiting the chamber cavity. Furthermore, and unless otherwise indicated, "ball" is understood as "ball or equivalent." Of course, the shape of the chamber may have any shape, and may be simple or complex.

Thus, in reference to the direction of gravity, thanks to the ball that is displaced within the chamber, when the first distal end is below the second distal end, the locking device allows relative movement in translation in the axial direction of the first portion in relation to the second portion while, when the first distal end is above the second distal end, the locking device prevents relative movement in translation in the axial direction of the first portion in relation to the second portion. Furthermore, and unless otherwise indicated, the relative position "above" or "below" the first and second distal ends is considered in the direction of gravity.

The locking device is understood as a gravity locking device. Thus, in a first state where, considered in the direction of gravity, the first distal end is arranged above the second distal end, the locking device blocks, automatically and only thanks to the effects of gravity, movement in translation in the axial direction of the first portion in relation to the second portion while in a second state where, considered in the direction of gravity, the first distal end is arranged below the second distal end, the locking device allows, automatically and only thanks to the effects of gravity, movement in translation in the axial direction of the first portion in relation to the second portion.

Consequently, the manual device has a first configuration where the first portion can be displaced in the axial direction in relation to the second portion, for example, but not necessarily, to activate any mechanism, e.g. a mechanism to make a head retract/protrude from a distal end chosen from among the first distal end and the second distal end. In this first configuration the first distal end is below the second distal end. The manual device also has a second configuration where the first portion cannot be displaced in the axial direction in relation to the second portion thanks to the locking device, for example, but not necessarily, to block said mechanism to make a head retract/protrude. In this second configuration the first distal end is above the second distal end. Of course, the locking performed by the locking device may be a strict locking without axial slack between the first and second portions, locking with axial slack between the first portion and the second portion, or even a limitation of the relative axial path between the first portion and the second portion (i.e. blockage with relatively large slack).

It is understood that the chamber is formed of walls belonging only to the second portion ad/or to elements mounted on the second portion. Thus, the ball within the chamber cavity does not engage with the first portion, at least not directly.

It is understood that in the second configuration the ball of the locking device engages with at least one wall of the chamber to block the relative movements in translation in the axial direction between the first portion and the second portion while in the first configuration the ball does not engage with the at least one wall of the chamber to block the relative movements in translation in the axial direction between the first portion and the second portion (i.e. the ball allows the relative movements in relation in the axial direction between the first portion and the second portion). Thus, in the first configuration the ball is in a so-called free position (i.e. position where the locking device frees the first portion in axial movement in translation in relation to the second portion) while in the second configuration the ball is in a so-called locking position (i.e. position where the locking device blocks the first portion in axial movement in translation in relation to the second portion).

It is noted that thanks to the structure of the locking device, i.e. thanks to the ball, and notably the ball accommodated in a chamber, and unless otherwise indicated, the locking takes place in the second configuration independently of the configuration of any other possible element/mechanism of the manual device. Thus, for example, if the manual device has a mechanism to make a head of a distal end chosen from among the first and the second distal ends retract/protrude, the locking device blocks the movement in translation of the first portion in relation to the second portion regardless of the position of said head, i.e. whether the head is in a retracted or protruding position (and this, of course, is only when the first distal end is above the second distal end).

For example, the head is made of any tool end piece of the manual device, e.g. the end piece of a key, screwdriver, blade, awl, writing body (felt-tip, ballpoint or otherwise, graphite lead, chalk or any medium allowing a substratum to be written on), brush, eraser, friction body, pad for a capacitive screen, cosmetic applicator (brush, pencil, mascara brush, roll-on, lipstick or any cosmetic application medium), etc.

Thus, thanks to the locking device, it is possible to avoid manipulating/activating (e.g. retracting/protruding) a first head of the manual device when using a second head opposite the first head in the axial direction of the manual device (the activation of the first head taking place, of course, through relative movement in translation in the axial direction of a first portion in relation to a second portion). Furthermore, the structure of the locking device has the advantage of being compact, particularly thanks to the chamber arranged in the second portion that is fitted into the first portion, which reduces the general volume of the manual device, thanks to which the manual device can have dimensions that can be adapted to the hands of the majority of users.

In some embodiments a wall of the chamber forms a catch moveable between a first position and a second position, the ball allowing the catch to come into the first position when, considered in the direction of gravity, the first distal end is arranged below the second distal end whereas the ball moves and locks the catch in the second position when, considered in the direction of gravity, the first distal end is arranged above the second distal end.

It is understood that among the different walls of the chamber, a wall forms the catch moveable between the first position and the second position. When the manual device is in the second configuration, the catch is in the second position thanks to the ball, whereas in the first configuration of the manual device, the ball releases the catch and allows it to come into the first position.

Such a system allows strong, reliable locking/releasing and does not impact or only slightly impacts the general size of the manual device.

In some embodiments, in the first position the catch allows the movement in translation in the axial direction of the first portion in relation to the second portion (and conversely) while in the second position the catch blocks the movement in translation in the axial direction of the first portion in relation to the second portion (and conversely).

It is understood that in the second position the catch engages with the first portion to block the movement in translation in the axial direction of the first portion in relation to the second portion while in the first position the catch does not engage with the first portion to block the movement in translation in the axial direction of the first portion in relation to the second portion. In other words, in the first position the catch frees the first portion in relation to the second portion (and conversely). Such a catch allows strong, reliable locking/releasing and does not impact or only slightly impacts the general size of the manual device.

In some embodiments, the catch has a locking projection, said locking projection being engaged with a shoulder of the first portion in the second position, thanks to which movement in translation in the axial direction of the first portion in relation to the second portion is blocked.

It is understood that in the first position the projection is not engaged with the shoulder whereas in the second position the projection is engaged with the shoulder. Thus, in the second position, being engaged with the shoulder, the projection engages tightly in the axial direction with the shoulder and blocks the movement in translation in the axial direction of the first portion in relation to the second portion. In the first position, the projection being free of the shoulder and not engaging with the shoulder, the first portion and the second portion can be displaced in the axial direction in relation to one another. Such a structure allows strong, reliable locking/releasing and does not impact or only slightly impacts the general size of the manual device.

In some embodiments the locking projection and/or the shoulder has (have) a beveled portion configured to disengage the catch from the shoulder upon pushing the second portion in an axial direction in relation to the first portion when, considered in the direction of gravity, the first distal end is arranged below the second distal end, thanks to which the catch is moved into the first position.

It is understood that only the projection has a beveled portion, or only the shoulder has a beveled portion, or the projection and the shoulder each have a beveled portion, e.g. complementary beveled portions.

It is understood that in the first configuration the latch does not necessarily return to the first position on its own. In this configuration the ball simply releases the catch and leaves it free to return to the first position. However, in the first configuration the catch can also be in the second position, but it is not locked in the second position. Thus, in the first configuration, when the second portion is displaced in relation to the first portion in a first axial direction (e.g. the direction tending to bring the second distal end toward the first distal end)—or when the first portion is displaced in a second axial direction opposite the first axial direction in relation to the second portion (e.g. the direction tending to bring the first distal end toward the second distal end)—the beveled portion(s) allow the projection to be disengaged from the shoulder through sliding engagement of the surfaces in contact, thanks to which the catch is moved into the first position. Of course, in the second configuration, the ball locks the catch in the second position so that even if the second portion is displaced in relation to the first portion in the first axial direction (or if the first portion is displaced in the second axial direction in relation to the second portion), the catch remains in the second position. Such a structure allows strong, reliable locking/releasing and does not impact or only slightly impacts the general size of the manual device.

In some embodiments the ball or equivalent is metallic.

A metallic ball has a certain inertia, which improves its ability to maintain a locking position.

In some embodiments the first distal end is provided with a first head while the second distal end is provided with a second head.

Such a manual device provided with the ball locking device is particularly suitable for instruments having two heads.

In some embodiments the first head is retractable thanks to a retraction mechanism, the retraction mechanism comprising a lateral button coupled with the second portion.

It is understood that a lateral button is a button that projects in a transverse direction in relation to the axial direction, and which is placed laterally, in relation to the first and second distal ends. The manual device provided with the ball locking device is particularly suitable for instruments having retraction/advancing mechanisms for a head with a lateral button. This allows, for example, the activation of the mechanism to be locked when the first distal end is above the second distal end, but the mechanism can be activated by the lateral button and/or, if necessary, via the second distal end when the first distal end is below the second distal end.

In some embodiments when the retraction mechanism is in a state where the first head is protruding, the locking device is configured to allow the relative displacement of the first portion in relation to the second portion in the direction, regardless of the relative position of the first distal end in relation to the second distal end, considered in the direction of gravity.

It is understood that when the retraction mechanism is in a state where the first head is protruding, the locking device cannot block the relative displacement in the axial direction between the first portion and the second portion. This allows greater flexibility of use of the first head. Furthermore, in the case that the manual device is configured such that the second head is not visible when the first head is protruding, and conversely, this allows the relative displacement of the two portions to be blocked only if the second head is protruding, and thus usable. Otherwise, it is useless to block the displacement since the second head is not visible and therefore not usable, even if the first distal end is arranged above the second distal end (considered in the direction of gravity).

In some embodiments the manual device forms a writing instrument extending in the axial direction.

It is understood that the first distal end and/or the second distal end is provided with a writing tip, e.g. a retractable tip or a fixed tip, e.g. mechanical pencil lead, a graphite tip, a ballpoint, a felt tip, etc. For example, the first head and/or the second head is/are a writing point.

Such a manual device provided with a ball locking device is particularly suitable for writing instruments.

In some embodiments the first head is a writing tip while the second head is an eraser, a friction body or a pad for a capacitive screen.

A friction body is understood as a body arranged to be rubbed on a surface, e.g. to generate heat and cause a change in the color of a thermochromic ink, i.e. an ink that changes color based on the heat to which it is exposed.

A pad for a capacitive screen is understood as an end provided to interact with a capacitive screen. The pad is a conductor (thanks to its manufacturing material or thanks to a coating). The shape, flexibility/rigidity and material(s) of a pad are not limited to the extent that this pad is able to interact with a capacitive screen, i.e. its contact with a capacitive screen is detectable by the same.

The manual device provided with a ball locking device is particularly suitable for writing instruments having such combinations of heads.

In some embodiments the first head is a nib held by a nib-advancing mechanism (i.e. nib and mechanical pencil mechanism), the nib-advancing mechanism comprising a lateral button coupled with the second portion.

BRIEF DESCRIPTION OF THE DRAWINGS

The disclosure and its advantages will be understood after reading the detailed description provided below of different embodiments provided as non-limiting examples. This description refers to the annexed figure pages, wherein.

DETAILED DESCRIPTION

FIGS. 1 to 4 represent a manual device 10, in this example a writing instrument, and more particularly a retractable ballpoint pen, comprising a first portion 12 and a second portion 14 fitted into the first portion 12 and being moveable in translation in an axial direction X. The direction X of relative gliding between the first and second portions 12 and 14 corresponds to the direction in which the manual device 10 extends.

Figure 1:
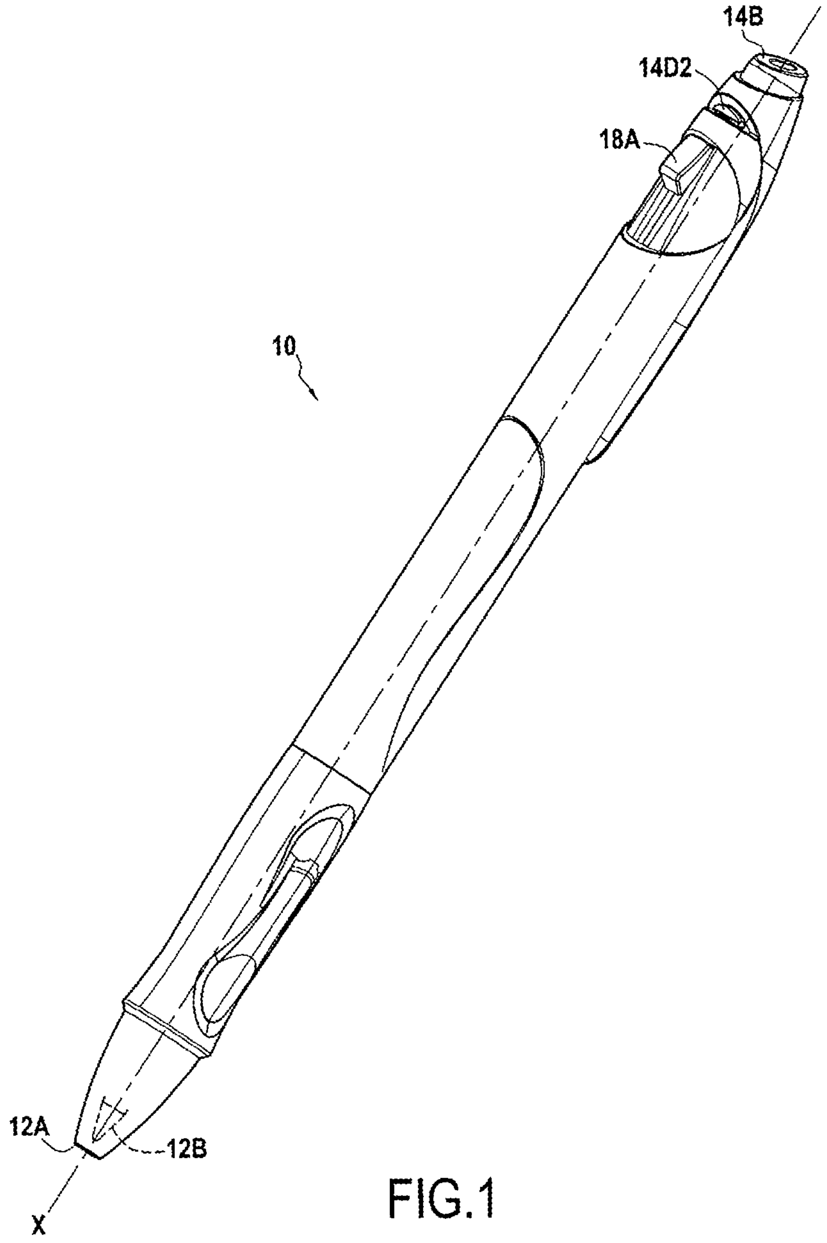
FIG. 1 is a perspective drawing of a manual device.
Figure 2:
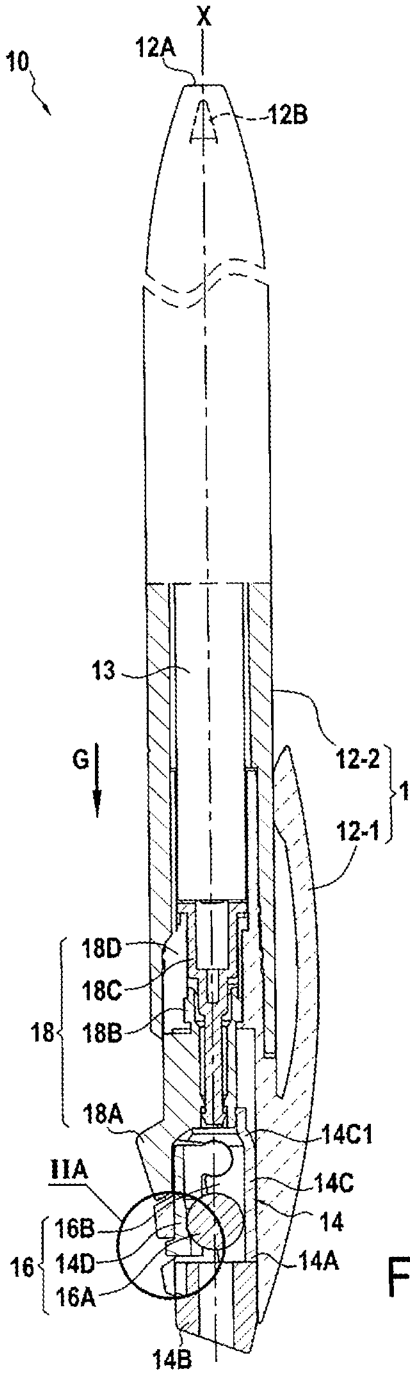
FIG. 2 is a partial sectional drawing of the manual device from FIG. 1, the first distal end being, considered in the direction of gravity, above the second distal end.
Figure 2A:
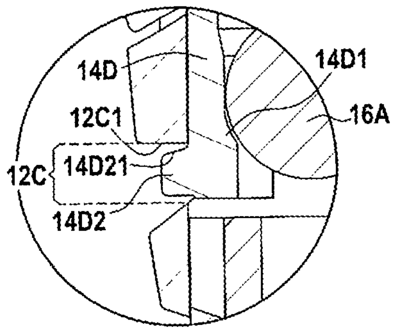
FIG. 2A is a close-up view of IIA from FIG. 2.
Figure 3:
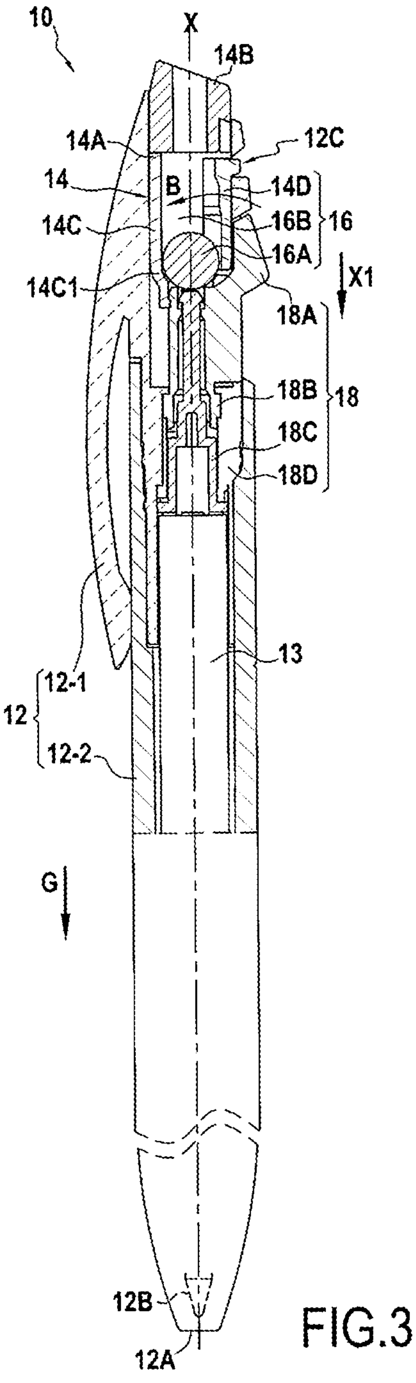
FIG. 3 is a partial sectional drawing of the manual device from FIG. 1, the first distal end being, considered in the direction of gravity, below the second distal end while the catch is in the second position.

The first portion 12 has a first distal end 12A provided with a first head 12B and having an orifice for the passage of the first head 12B. The first head 12B is a writing point, and more particularly a ballpoint that can retract/protrude from the first portion 12A. In FIGS. 1, 2 and 3 the first head 12B is fitted in the first portion 12 while in FIG. 4 the first head 12B is protruding and projecting from the first distal end 12A. The first portion 12 is formed of two pieces 12-1 and 12-2 snap locked to one another (not represented). Of course, according to a variant, the first portion 12 can comprise more than two pieces. The first portion 12 accommodates a retraction mechanism 18 to make the first head 12B retract/protrude when the button 18A is displaced.

The mechanism 18 is a ratchet mechanism and comprises, as is known moreover, a lateral button 18A, a piston 18B, a rotary cam 18C and a fixed cam 18D. It is noted that in this example the lateral button 18A and the piston 18B form one and the same piece. The button 18A is snap locked to the second portion 14, thanks to which the second portion 14 and the button 18A are coupled in translation in an axial direction X. Of course, as is known moreover, a non-represented spring allows the rotary cam 18C to be coupled with the body 13, in this example an ink reservoir having a ballpoint 12B.

The second portion 14 has a second distal end 14A provided with a second head 14B, in this example a friction body. The second portion 14 being coupled with the button 18A, the first portion 12 is displaced in relation to the second portion 14 (or conversely) in movement in translation in the axial direction X by displacing the button 18A in the action direction A. In FIGS. 1, 2 and 3 the second head 14B is protruding from the first portion (which has an orifice for the passage of the second head 14B) while in FIG. 4 the second head 14B is fitted in the first portion 12.

Figure 4:
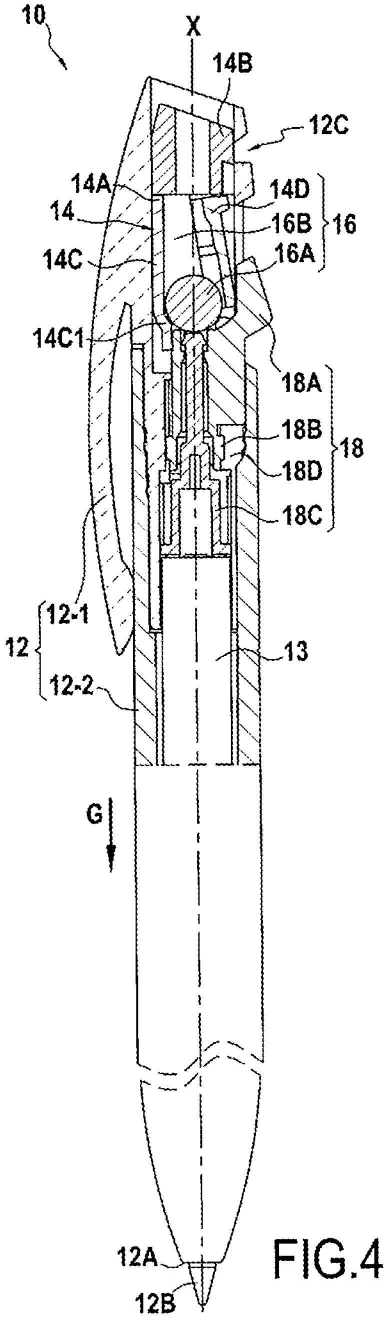
FIG. 4 is a partial sectional drawing of the manual device from FIG. 1, the first distal end being, considered in the direction of gravity, below the second distal end while the catch is in the first position.

A locking device 16 represented in FIGS. 2 to 4 allows the movement in translation of the first portion 12 in relation to the second portion 14 in the axial direction to be blocked only when, considered in the direction of gravity G, the first distal end 12A is arranged above the second distal end 14B (position represented in FIG. 2). In other words, when, considered in the direction of gravity G, the first distal end 12A is arranged below the second distal end 14B (position represented in FIGS. 3 and 4), the locking mechanism allows the movement in translation of the first portion 12 in relation to the second portion 14 in the axial direction X.

The locking device 16 comprises a metallic ball 16A and a chamber 16B accommodating the ball 16A. The chamber 16B is provided only in the second portion 14. More particularly, the second portion 14 comprises a first section 14C forming a hollow annular case extending in the axial direction X and accommodating the ball 16A. This case 14C forms a first wall of the chamber 16B. The case 14C has a cut receiving a second section 14D, mounted to pivot around a direction perpendicular to the axial direction X on the case 14C. This second section 14D forms a second wall of the chamber 16B. More particularly, this second section 14D forms a mobile catch between a first position (see FIG. 4) and a second position (see FIG. 2). This catch 14D is, of course, part of the locking device 16. On the side opposite the second distal end 14B in the axial direction X, the case 14C has a constriction 14C1 arranged to hold the ball 16A in the chamber 16B within the second portion 14. On the side of the second distal end 14A, the catch 14D has a bulge 14D1 arranged to hold the ball in the chamber 16 within the second portion 14. According to a variant the catch 14D does not have a bulge, while the second head 14B prevents the ball 16B from leaving the case 14C. Thus, the chamber 16B is arranged only in the second portion 14.

The catch 14D has a locking projection 14D2 projecting radially to the outside and being arranged to engage with a shoulder 12C1 (i.e. tightly engage in the axial direction with the shoulder 12C1). The shoulder 12C1 is formed by the edge of a window 12C arranged in the piece 12-1 of the first portion 12. More particularly, the shoulder 12C1 is oriented in the axial direction X toward the second distal end 14B. The portion 14D21 of the projection 14D2 oriented toward the first distal end 12B (i.e. toward the shoulder 12C1) is beveled while the shoulder 12C extends perpendicularly in the axial direction X (i.e. is not beveled).

We will now describe the functioning of the locking mechanism 16 in reference to FIGS. 2 to 4.

In FIG. 2, considered in the direction of gravity G, the first distal end 12A is arranged above the second distal end 14A. Under the force of gravity G, the ball 16A is displaced to the lowest possible position (from the side of the second distal end 14A) within the chamber 16A. In other words, in this position, the ball 16A is supported against the bulge 14D1. This results in the catch 14D being pushed and locked in the second position. In the second position the projection 14D2 is engaged in the window 12C with the shoulder 12C1. Thus, under the combined effect of the ball 16A that locks the catch 14D in the second position and of the projection 14D2 that tightly engages with the shoulder 12C1, the displacement of the second portion 14 in relation to the first portion 12 in the axial direction X is blocked. The configuration represented in FIG. 2 corresponds to the second configuration described above.

In this example, in the second configuration, since the second head 14B is held by the second portion 14, the second head 14B cannot be displaced in the axial direction X in relation to the first portion 12. Furthermore, the button 18A being coupled with the second portion 14, it is also not possible to activate the retraction mechanism 18 to make the first head retract/protrude.

In FIG. 3, considered in the direction of gravity G, the first distal end 12A is arranged below the second distal end 14A. Under the force of gravity G, the ball 16A is displaced to the lowest possible position (from the side opposite the second distal end 14A) within the chamber 16A. In other words, in this position, the ball 16A is supported against the constriction 14C1. This results in the catch 14D being freed. However, the catch 14C does not necessarily shift toward the first position. To do this, the button 18A must be displaced in an axial direction X1, in the direction tending to bring the button 18A (or the second distal end 14A) closer toward the first distal end 12A. The button 18A being coupled in displacement in the axial direction X with the second portion 14, the displacement of the button 18A in this axial direction X1 drags the second portion 14 in this same axial direction X1. The ball 16A having freed the catch 14D, thanks to the beveled portion 14D21, this displacement causes the catch 14D to shift according to the arrow B in FIG. 3, thanks to which the catch 14D is dragged from the second position toward the first position. In FIG. 3 the catch 14D is in the second position while in FIG. 4 the catch 14D is in the first position. The configuration of the device represented in FIGS. 3 and 4 corresponds to the first configuration described above.

In FIG. 4, considered in the direction of gravity G, the first distal end 12A is arranged below the second distal end 14A and the retraction mechanism of the first head 12B has been activated (in relation to FIG. 3). The button 18A being coupled with the second portion 14, the second portion 14 has been displaced in the axial direction X in relation to the first portion 12. It is noted that thanks to the dimensions of the different pieces (i.e. pieces of the retraction mechanism 18, but also of the second portion 14 and of the second head 14B), when the first head 12B is protruding, the second head 14B is not visible, and conversely. Of course, according to a variant, the second head may be protruding while the first head is protruding or not visible (i.e. whatever the state of the retraction mechanism).

It is also noted in FIG. 4 that when the retraction mechanism 18 is in a state where the first head 12B is protruding, the catch 14D is locked in the second position and can no longer return to the first position. More particularly, in this example, when the retraction mechanism 18 is in a state where the first head is protruding, the projection 14D2 is no longer opposite the window 12C, such that the catch 14D is locked in the second position. Thus, generally, in this example, if the retraction mechanism 18 (or more generally, the actuation mechanism of the first head) is in a state where the first head 12B is protruding, the locking device 16 is arranged to allow the relative displacement of the first portion 12 in relation to the second portion 14 in the direction X regardless of the relative position of the first distal end 12A in relation to the second distal end (considered, of course, in the direction of gravity G). Thus, for the locking device 16 to block the relative displacement of the first portion 12 in relation to the second portion 14 in the direction X, the retraction mechanism 18 must be in a state where the first head 12B is not visible. In this example, this allows the displacement of the first portion 12 in relation to the second portion 14 to be blocked when, considered in the direction of gravity G, the first distal end 12A is above the second distal extremity 14A, only if the second head 14B is protruding. Actually, it is only if the second head 14B is protruding that it is usable, and its use risks inadvertently activating the retraction mechanism 18, which is prevented thanks to the locking device 16. Of course, if the retraction mechanism 18 is in a state where the first head 12B is protruding and, considered in the direction of gravity G, the first distal end 12A is above the second distal end 14A, the retraction mechanism 18 can be actuated such that the first head 12B is not visible and the second head 14B protrudes, the locking device 16 then blocking, thanks to the displacement of the ball 16A by gravity, the relative displacement in the axial direction X between the first portion 12 and the second portion 14 when the retraction mechanism 18 moves into a state where the first head 12B is not visible (and thus where the second head 14B is protruding).

Figure 5:
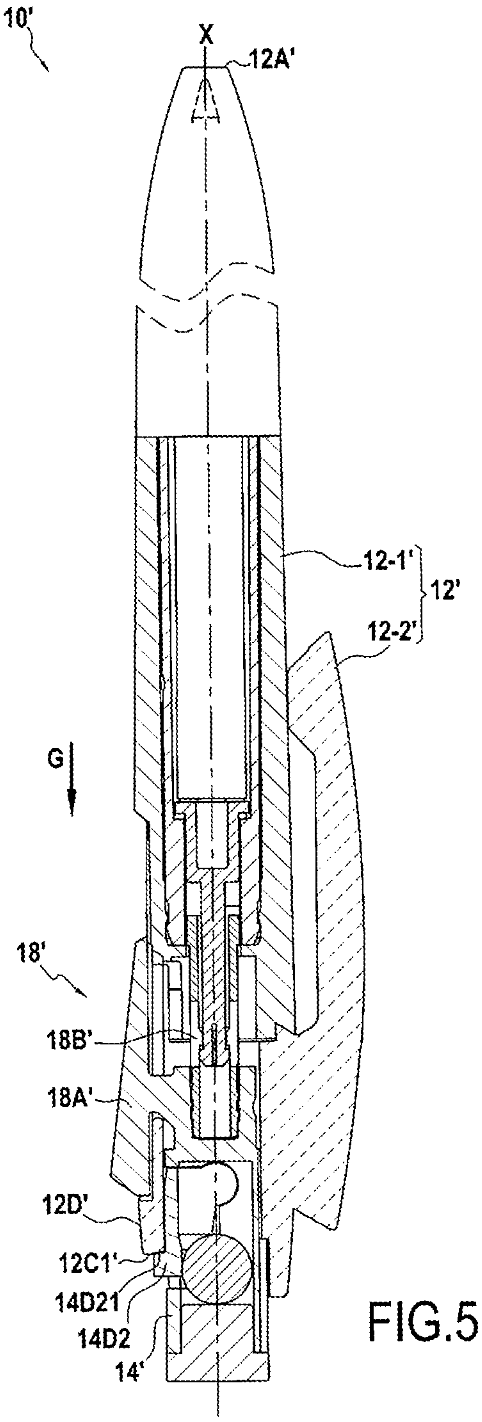
FIG. 5 is a first variant of the manual device shown in FIG. 1.

FIG. 5 represents a first variant 10' of the manual device 10. In this manual device 10', the shapes of the first portion 12', of the second portion 14', and of the button 18A' are different from the first and second portions 12 and 14 and of the button 18A of the manual device 10. However, from a functional standpoint, these modifications have only a limited impact. In fact, the primary difference from the manual device 10 is that the shoulder 12C1' of the device 10' is formed by an edge of the distal end 12D' of the first portion 12' opposite the first distal end 12' in the axial direction X, and not by an edge of a window as in manual device 10. This allows, for example, the projection 14D2 to be manually disengaged from the shoulder 12C1'. Furthermore, the shoulder 12C1' has a beveled section complementary to the beveled section 14D21 of the catch 14D. Moreover, it is noted that the retraction mechanism 18' comprises a piston 18B' that is distinct from the button 18A'. Of course, the device 10' works in a way absolutely similar to the device 10.

Figure 6:
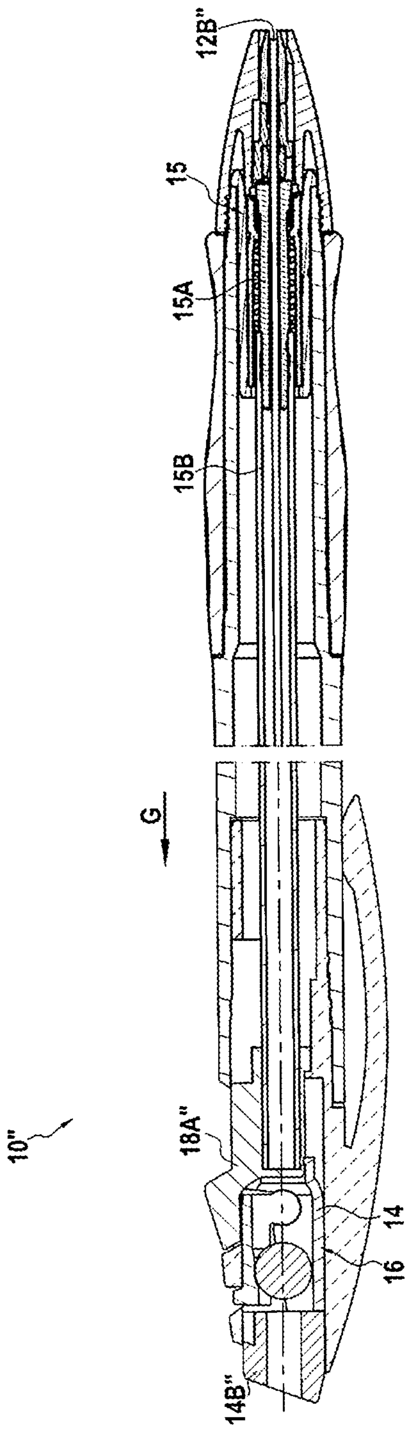
FIG. 6 is a second variant of the manual device shown in FIG. 1.

FIG. 6 represents a second variant 10" of the manual device 10 from FIG. 1. The manual device 10" is similar to the manual device 10 from FIG. 2 and notably has the same locking device 16. The manual device 10" only differs from the manual device 10 in that the first head 12B" is a nib held by a nib-advancing mechanism 15 rather than a ballpoint that can be hidden. Thus, the second portion 14 of the manual device 10" engages axially with a nib reservoir 15B that extends axially up to the clamps 15A of the nib-advancing mechanism 15. In this example, the second portion 14 engages axially with the nib reservoir 15B by means of a lateral button 18A". This lateral button 18A" is coupled with the second portion through a snapping mechanism and serves to activate the nib-advancing mechanism 15. Of course, nib-advancing mechanism 15 can also be activated via the second head 14B", in this example a pencil eraser. According to a non-represented variant, the lateral button 18A" and the second portion 14 form one and the same piece. According to yet another non-represented variant, the first variant 10' is provided with a nib held by a nib-advancing mechanism similar to the one from the second variant 10".

Although the present disclosure has been described with reference to specific embodiments, it is obvious that modifications and changes can be made on these examples without transcending the general scope of the disclosure as defined by the claims. In particular, individual characteristics of the different embodiments illustrated/mentioned can be combined in additional embodiments. Consequently, the description and the drawings should be considered in an illustrative sense rather than a restrictive one.

The invention claimed is:

1. A writing instrument comprising:

a first portion and a second portion, the second portion being at least partially fitted into the first portion and being moveable in an axial direction relative to the first portion;

the first portion includes a first distal end while the second portion includes a second distal end opposite the first distal end, and a lock;

the first distal end is provided with a first head that includes a writing tip or a nib;

the second distal end is provided with a second head;

wherein the lock is movable between a first configuration and a second configuration by gravity only, wherein in the first configuration, the lock is configured to permit relative axial movement between the first portion and the second portion, and in the second configuration, the lock is configured to prevent relative axial movement between the first portion and the second portion;

wherein the first head includes a retraction mechanism, the retraction mechanism facilitates a retractable movement of the first head to protrude either outside or extend inside of the writing instrument.

2. The writing instrument of claim 1, wherein the retraction mechanism includes a lateral button coupled with the second portion.

3. A writing instrument comprising:

a first portion and a second portion, the second portion being at least partially fitted into the first portion and being moveable in an axial direction relative to the first portion;

the first portion includes a first distal end while the second portion includes a second distal end opposite the first distal end, and a lock;

the first distal end includes a writing tip or a nib;

wherein, when the first distal end is arranged above the second distal end in a direction of gravity, the lock is configured to:

prevent relative axial movement between first portion and the second portion when the writing tip or nib is in a retracted position; and allow relative axial movement between the first portion and the second portion when writing tip or nib is in an extended position.

4. The writing instrument of claim 3, wherein the lock includes a ball.

5. The writing instrument of claim 3, wherein the second distal end is provided with a second head, the second head is selected from the group consisting of an eraser, a friction body or a pad for a capacitive screen.

6. A writing instrument comprising:

a first portion and a second portion, the second portion being at least partially fitted into the first portion and being moveable in an axial direction relative to the first portion;

the first portion includes a first distal end while the second portion includes a second distal end opposite the first distal end, and a lock;

the first distal end includes a writing tip or a nib;

wherein the lock is movable between a first configuration and a second configuration, the lock including a chamber and a movable element disposed in the chamber, wherein the chamber is positioned within only the second portion, wherein in the first configuration, the lock is configured to permit relative axial movement between the first portion and the second portion, and in the second configuration, the lock is configured to prevent relative axial movement between the first portion and the second portion;

wherein the lock is configured to move between the first configuration and the second configuration by inversion of the writing instrument.

7. The writing instrument of claim 6, wherein the lock is movable between the first configuration and the second configuration by gravity only.

8. The writing instrument of claim 6, wherein the lock includes a ball.

9. The writing instrument of claim 8, wherein the ball is metallic.

10. The writing instrument of claim 6, wherein the chamber includes a wall that is movable between a first position and a second position.

11. The writing instrument of claim 10, wherein in the first position the wall allows translational movement of the first portion, in the axial direction in relation to the second portion, while in the second position the wall blocks translational movement of the first portion, in the axial direction in relation to the second portion.

12. The writing instrument of claim 10, wherein the wall includes a locking projection, the locking projection being configured to engage with a shoulder of the first portion in the second position, while translational movement of the first portion, in the axial direction in relation to the second portion, is blocked.

13. The writing instrument of claim 12, wherein the locking projection includes a beveled portion configured to disengage the wall from the shoulder upon movement of the second portion in the axial direction in relation to the first portion.

14. The writing instrument of claim 6, wherein the first distal end is provided with a first head while the second distal end is provided with a second head, wherein the first head includes the writing tip or the nib.

15. The writing instrument according to claim 14, wherein the second head is selected from the group consisting of an eraser, a friction body or a pad for a capacitive screen.

16. The writing instrument according to claim 14, wherein the first head includes the nib, and the nib is held by a nib-advancing mechanism.

17. The writing instrument according to claim 16, wherein the nib-advancing mechanism includes a lateral button coupled with the second portion.

18. The writing instrument according to claim 14, wherein the first head includes a retraction mechanism, the retraction mechanism facilitates a retractable movement of the first head to protrude either outside or extend inside of the writing instrument.

19. The writing instrument according to claim 18, wherein, the retraction mechanism includes a lateral button coupled with the second portion.

20. The writing instrument according to claim 18, wherein, when the first head is protruding, the lock is arranged to allow a relative displacement of the first portion in relation to the second portion in the direction of gravity, regardless of a relative position of the first distal end in relation to the second distal end.

* * * * *